United States Patent
Han et al.

(10) Patent No.: US 9,414,398 B2
(45) Date of Patent: Aug. 9, 2016

(54) DATA SENDING METHOD AND USER EQUIPMENT

(71) Applicant: HUAWEI TECHNOLOGIES CO., LTD., Shenzhen (CN)

(72) Inventors: Guanglin Han, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 14/193,334

(22) Filed: Feb. 28, 2014

(65) Prior Publication Data

US 2014/0177573 A1 Jun. 26, 2014

Related U.S. Application Data

(63) Continuation of application No. PCT/CN2012/080917, filed on Sep. 3, 2012.

(30) Foreign Application Priority Data

Sep. 1, 2011 (CN) .......................... 2011 1 0256533

(51) Int. Cl.
*H04W 4/00* (2009.01)
*H04W 72/10* (2009.01)
(Continued)

(52) U.S. Cl.
CPC .............. *H04W 72/10* (2013.01); *H04L 5/0044* (2013.01); *H04L 5/0064* (2013.01); *H04W 72/1242* (2013.01); *H04L 5/0007* (2013.01); *H04W 72/1289* (2013.01)

(58) Field of Classification Search
CPC ...... H04W 72/04; H04W 88/08; H04W 76/00
See application file for complete search history.

(56) References Cited

U.S. PATENT DOCUMENTS

2009/0219868 A1* 9/2009 Lee .................. H04L 5/0096 370/329
2009/0323842 A1* 12/2009 Zhang .................. H04L 27/10 375/260

(Continued)

FOREIGN PATENT DOCUMENTS

CN 1972462 5/2007
CN 101895987 11/2010

(Continued)

OTHER PUBLICATIONS

Extended European Search Report dated May 8, 2014 in corresponding European Patent Application No. 12828044.3.
PCT International Search Report and Written Opinion of the International Searching Authority dated Dec. 13, 2012 in corresponding International Patent Application No. PCT/CN2012/080917.

(Continued)

*Primary Examiner* — Hassan Phillips
*Assistant Examiner* — Siren Wei
(74) *Attorney, Agent, or Firm* — Staas & Halsey LLP

(57) ABSTRACT

The present invention discloses a data sending method and a user equipment, and relates to the field of mobile communications. The method includes: receiving at least two uplink grants allocated by a base station; grouping uplink grants received at different moments in the at least two uplink grants to obtain multiplexing resources; and multiplexing data to be sent onto transport blocks corresponding to the multiplexing resources and sending the transport blocks. The user equipment includes a receiving module, a processing module and a sending module. In embodiments of the present invention, uplink grants are grouped according to sending moments of transport blocks corresponding to the uplink grants so as to determine multiplexing resources, and data is multiplexed onto transport blocks corresponding to the grouped uplink grants and the transport blocks are sent.

20 Claims, 6 Drawing Sheets

(51) Int. Cl.
*H04W 72/12* (2009.01)
*H04L 5/00* (2006.01)

(56) References Cited

U.S. PATENT DOCUMENTS

| | | | | |
|---|---|---|---|---|
| 2010/0091725 A1* | 4/2010 | Ishii | .................. | H04W 72/1268 370/329 |
| 2010/0150086 A1* | 6/2010 | Harada | ............. | H04W 56/0005 370/329 |
| 2010/0232385 A1* | 9/2010 | Hsu | ....................... | H04W 74/02 370/329 |
| 2010/0271970 A1* | 10/2010 | Pan | ....................... | H04L 1/0026 370/252 |
| 2010/0281486 A1* | 11/2010 | Lu | ..................... | H04W 72/1247 718/104 |
| 2011/0039568 A1* | 2/2011 | Zhang | ................. | H04W 74/002 455/452.1 |

FOREIGN PATENT DOCUMENTS

| | | | | |
|---|---|---|---|---|
| EP | 2244514 | 10/2010 | | |
| JP | EP 2244514 A1 * | 10/2010 | ............ | H04L 5/0007 |
| WO | 2011/019204 | 2/2011 | | |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.2.0, Jun. 2011, pp. 1-54.

"Logical Channel Prioritization for Aggregated Carriers", LG Electronics Inc., 3GPP TSG-RAN2 Meeting #67, China, Aug. 2009, pp. 1-3.

International Search Report mailed Dec. 13, 2012, in corresponding International Application No. PCT/CN2012/080917.

* cited by examiner

DATA SENDING METHOD AND USER EQUIPMENT

CROSS-REFERENCE TO RELATED APPLICATION

This application is a continuation of International Application No. PCT/CN2012/080917, filed on Sep. 3, 2012, which claims priority to Chinese Patent Application No. 201110256533.2, filed on Sep. 1, 2011, both of which are hereby incorporated by reference in their entireties.

TECHNICAL FIELD

The present invention relates to the field of mobile communications, and in particular, to a data sending method and a user equipment.

BACKGROUND

In an LTE (Long Term Evolution, Long Term Evolution) system, when a new transmission needs to be performed, in a multiplexing (Multiplexing) process, an LCP (Logical Channel Prioritization, logical channel prioritization) multiplexing process needs to be applied. When a UE (User Equipment, user equipment) receives a plurality of uplink resources or UL Grants (Uplink Grant, uplink grant), the UE can selectively multiplex the received UL Grants according to a random sequence, and multiplex, through an LCP process, contents to be sent onto TBs (Transport Block, transport block) corresponding to the UL Grants, and the UE can bear data and MAC (Media Access Control) CEs (Control Element, control element) to be sent and from a logical channel on any TB.

After the prior art is analyzed, the inventor finds that the prior art has at least the following disadvantages:

If the UE processes the received UL Grants within one same TTI (Transmission Time Interval, transmission time interval) according to a random sequence, including an RAR (Random Access Response, random access response) UL Grant, a PDCCH (Physical Downlink Control Channel, physical downlink control channel) C-RNTI (Cell-Radio Network Temporary Identifier, cell-radio network temporary identifier) UL Grant, and an SPS (Semi-Persistent Scheduling, semi-persistent scheduling) C-RNTI UL Grant, the UE may possibly multiplex high priority data onto transport blocks with relatively long delays, which increases a transmission delay of the high priority data.

SUMMARY

Embodiments of the present invention provide a data sending method and a user equipment. The technical solution is as follows:

According to one aspect, a data sending method includes:
receiving at least two uplink grants allocated by a base station;
grouping uplink grants received at different moments in the at least two uplink grants to obtain multiplexing resources; and
multiplexing data to be sent onto transport blocks corresponding to the multiplexing resources and sending the transport blocks.

According to another aspect, a user equipment includes:
a receiving module, configured to receive at least two uplink grants allocated by a base station;
a processing module, configured to group uplink grants received at different moments in the at least two uplink grants received by the receiving module to obtain multiplexing resources; and
a sending module, configured to multiplex data to be sent onto transport blocks corresponding to the multiplexing resources obtained by the processing module and send the transport blocks.

The technical solution provided by the embodiments of the present invention has the following beneficial effects:

When uplink grants allocated by a base station are received, the uplink grants are grouped according to sending moments of transport blocks corresponding to the uplink grants so as to determine multiplexing resources, and data is multiplexed onto transport blocks corresponding to the grouped uplink grants and the transport blocks are sent, so that a UE can judge delays of different uplink resources according to the sending moments, and adjust a multiplexing order according to possible delays, so as to avoid an increase of delay when high priority data is transmitted.

BRIEF DESCRIPTION OF DRAWINGS

To describe the technical solution in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Before a data sending method provided by the present invention is introduced, basic parameters involved in the present invention are briefly introduced.

In an LTE system, in order to enable an eNodeB to be aware of a state of an uplink radio link of a UE, the eNodeB can configure, for the UE, an uplink grant for sending an uplink reference signal SRS (Sounding Reference Signal, uplink reference signal), and the UE sends an SRS on the allocated uplink grant.

Figure 1:
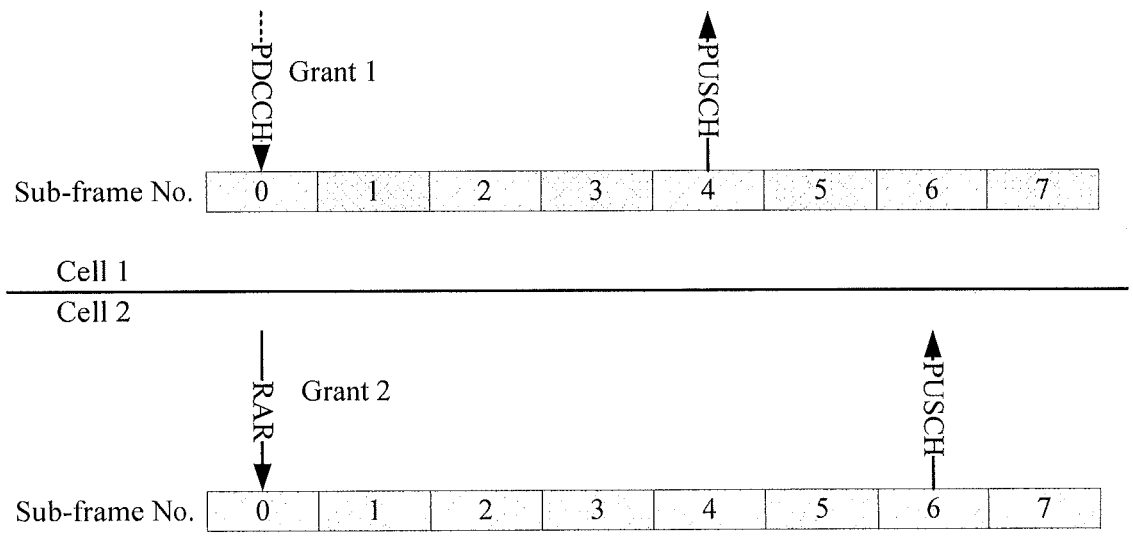
FIG. 1 is a schematic diagram of reception and sending of uplink grants in LTE FDD.

In a carrier aggregation scenario, a UE can receive an RAR UL Grant through an RAR on a carrier or a cell where the UE initiates an RA (Random Access, random access) process, and, on other carriers, the UE can simultaneously receive a PDCCH C-RNTI UL Grant dynamically scheduled by a PDCCH, or receive a semi-persistent scheduling SPS C-RNTI UL Grant dynamically scheduled by a PDCCH, or a configured uplink grant Configured UL Grant. For the RAR UL Grant, a relatively long delay exists between its reception and transmission. As shown in FIG. 1, subframe 0 of a UE on Cell 1 receives UL Grant 1 allocated by a PDCCH, and a corresponding PUSCH is sent at subframe 4; and if RAR UL Grant 2 is received on Cell 2 at the same time, a corresponding PUSCH is sent at subframe 6. However, an uplink grant corresponding to a Configured UL Grant regularly appears repeatedly in subsequent subframes according to SPS scheduling activation time and a rule that is configured by a base station.

Figure 2:
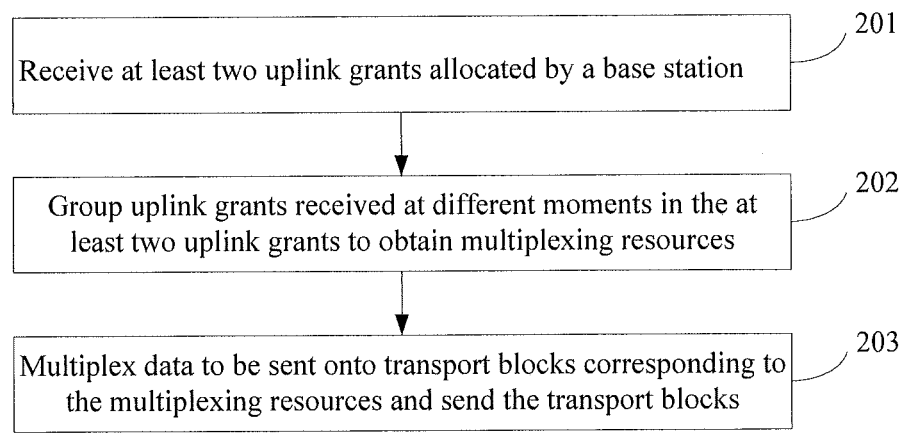
FIG. 2 is a flowchart of a data sending method according to an embodiment of the present invention.

FIG. 2 is a flowchart of a data sending method according to an embodiment of the present invention. The embodiment is executed by a UE (User Equipment, user equipment). Referring to FIG. 2, the embodiment includes:

201. Receive at least two uplink grants (UL Grant) allocated by a base station.

A base station may cover one or more cells, and the uplink grants may come from different cells covered by one base station. Generally, the at least two uplink grants include at least two of the following uplink grants: a PDCCH C-RNTI UL Grant, an SPS C-RNTI UL Grant, an RAR UL Grant, and a Configured UL Grant, where the PDCCH C-RNTI UL Grant and the SPS C-RNTI UL Grant may be dynamically scheduled by a PDCCH, the RAR UL Grant may be allocated to a UE by a base station to which the UE initiates a random access process, and the Configured UL Grant may be an UL Grant configured on the user equipment after semi-persistent scheduling is activated and appearing repeatedly according to a preset rule.

202. Group uplink grants received at different moments in the at least two uplink grants to obtain multiplexing resources.

In the embodiment, according to the sending moments of transport blocks corresponding to the at least two uplink grants, uplink grants received at different moments and sent at the same moment in the at least two uplink grants are grouped into one group and at least one group of multiplexing resources are obtained.

Figure 3:
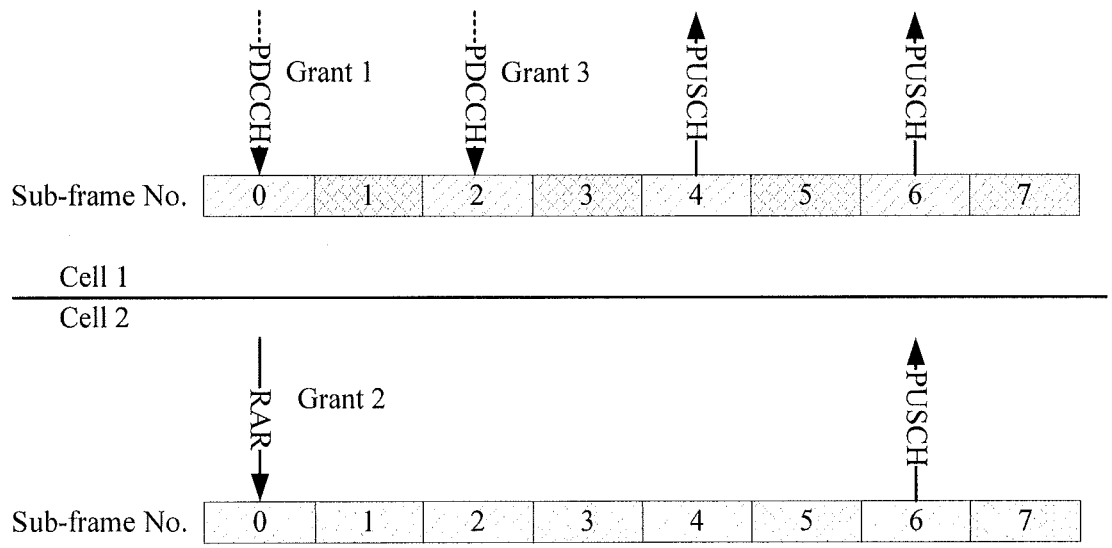
FIG. 3 is a schematic diagram of reception and sending of uplink grants in LTE FDD according to an embodiment of the present invention.

A person skilled in the art may know that an interval between a receiving moment and a sending moment varies with different types of uplink resources. Therefore, in the embodiment, for LTE FDD (Frequency Division Duplexing, frequency division duplexing), an RAR Grant received by a UE at a moment of subframe n may be grouped with a PDCCH C-RNTI UL Grant received at subframe n+2 into one group of multiplexing resources. For example, FIG. 3 is a schematic diagram of reception and sending of uplink grants in LTE FDD according to an embodiment of the present invention. As shown in FIG. 3, a UE receives PDCCH C-RNTI UL Grant1 of Cell 1 and RAR UL Grant2 of Cell 2 at subframe 0, and a sending moment of a transport block corresponding to the PDCCH C-RNTI UL Grant1 is subframe 4. Because a relatively long delay exists between reception and transmission of an RAR UL Grant, a sending moment of a transport block corresponding to the RAR UL Grant2 is subframe 6. The UE receives PDCCH C-RNTI UL Grant3 from Cell 1 at subframe 2 and a sending moment of a transport block corresponding to the PDCCH C-RNTI UL Grant3 is subframe 6. The sending moment of the transport block corresponding to UL Grant 1 is ahead of the sending moment of the transport block corresponding to UL Grant 2. Although UL Grant 1 and UL Grant 2 are received by the UE at the same time, in a multiplexing process, UL Grant 1 and UL Grant 2 are not put in one group of multiplexing resources, and because the transport blocks corresponding to UL Grant 2 and UL Grant 3 are sent to uplink at the same moment, UL Grant 1 sent at subframe 4 is used as one multiplexing resource group and RAR UL Grant 2 and PDCCH C-RNTI UL Grant3 sent at subframe 6 are used as another multiplexing resource group so as to execute a multiplexing process.

It should be noted that the multiplexing resources refer to one or more UL Grants to be sent in one subframe or TTI, or one or more transport blocks corresponding to the UL Grants.

203. Multiplex data to be sent onto transport blocks corresponding to the multiplexing resources and send the transport blocks.

A person skilled in the art may know that a specific process of the multiplexing data to be sent is the same as that in the prior art, which will not be repeated here. According to the example illustrated in FIG. 3, step 203 specifically includes: multiplexing the data to be sent, according to an order of precedence of sending moments, onto the transport block corresponding to UL Grant 1 and the transport blocks corresponding to UL Grant 2 and UL Grant 3; and sending the transport block corresponding to UL Grant 1 at subframe 4 and sending the transport blocks corresponding to UL Grant 2 and UL Grant 3 at subframe 6.

According to the method provided in the embodiment, when uplink grants allocated by a base station are received, the uplink grants are grouped according to sending moments of transport blocks corresponding to the uplink grants so as to determine multiplexing resources, and data is multiplexed onto transport blocks corresponding to the grouped uplink grants and the transport blocks are sent, so that a UE can judge delays of different uplink resources according to the sending moments, and adjust a multiplexing order according to possible delays, so as to avoid an increase of delay when high priority data is transmitted.

Figure 4:
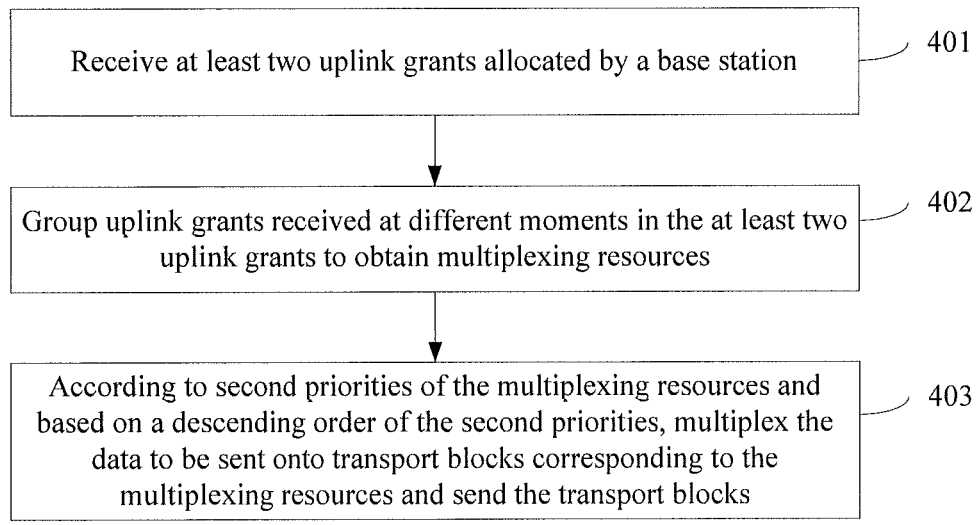
FIG. 4 is a flowchart of a data sending method according to an embodiment of the present invention.

FIG. 4 is a flowchart of a data sending method according to an embodiment of the present invention. The embodiment is executed by a UE (User Equipment, user equipment).

Referring to FIG. 4, the embodiment includes:

401. Receive at least two uplink grants allocated by a base station.

402. Group uplink grants received at different moments in the at least two uplink grants to obtain multiplexing resources.

A specific implementation manner of steps 401 and 402 is the same as that of steps 201 and 202 and will not be repeated here.

403. According to second priorities of the multiplexing resources and based on a descending order of the second priorities, multiplex data to be sent onto transport blocks corresponding to the multiplexing resources and send the transport blocks, where the second priorities are multiplexing priorities of uplink grants in the multiplexing resources.

In the embodiment, the at least two uplink grants include a PDCCH C-RNTI UL Grant, an SPS C-RNTI UL Grant, a Configured UL Grant, and an RAR UL Grant. For uplink grants in the same group of multiplexing resources, or uplink grants sent within the same TTI, second priorities of the PDCCH C-RNTI UL Grant, SPS C-RNTI UL Grant, and Configured UL Grant are higher than a second priority of the RAR UL Grant.

In a multiplexing process, multiplexing is performed one by one according to a multiplexing order or multiplexing priorities of transport blocks corresponding to the PDCCH C-RNTI UL Grant, the SPS C-RNTI UL Grant, the Configured UL Grant, and the RAR Grant. For example, the PDCCH C-RNTI UL Grant, the SPS C-RNTI UL Grant, and the Configured UL Grant have higher multiplexing priorities when multiplexing is performed, and the multiplexing priority of the RAR UL Grant is lower. Transport blocks corresponding to all the uplink grants may be multiplexed as a whole or multiplexed separately and independently.

The second priorities of uplink grants may be set based on categories of the UL Grants. For example, all PDCCH C-RNTI UL Grants, SPS C-RNTI UL Grants and Configured UL Grants have high multiplexing priorities and the same multiplexing priority is adopted among PDCCH C-RNTI UL Grants, SPS C-RNTI UL Grants and Configured UL Grants; all RAR UL Grants have low multiplexing priorities and the same multiplexing priority is adopted among RAR UL Grants; and all uplink grants of each priority can be multiplexed as a whole or multiplexed separately and independently.

According to the method provided in the embodiment, when uplink grants allocated by a base station are received, the uplink grants are grouped according to sending moments of transport blocks corresponding to the uplink grants so as to determine multiplexing resources, and data is multiplexed onto transport blocks corresponding to the grouped uplink grants and the transport blocks are sent, so that a UE can judge delays of different uplink resources according to the sending moments, and adjust a multiplexing order according to possible delays, so as to avoid an increase of delay when high priority data is transmitted. Further, uplink grants in one multiplexing group are multiplexed according to multiplexing priorities, which ensures timeliness of data sending.

Figure 5:
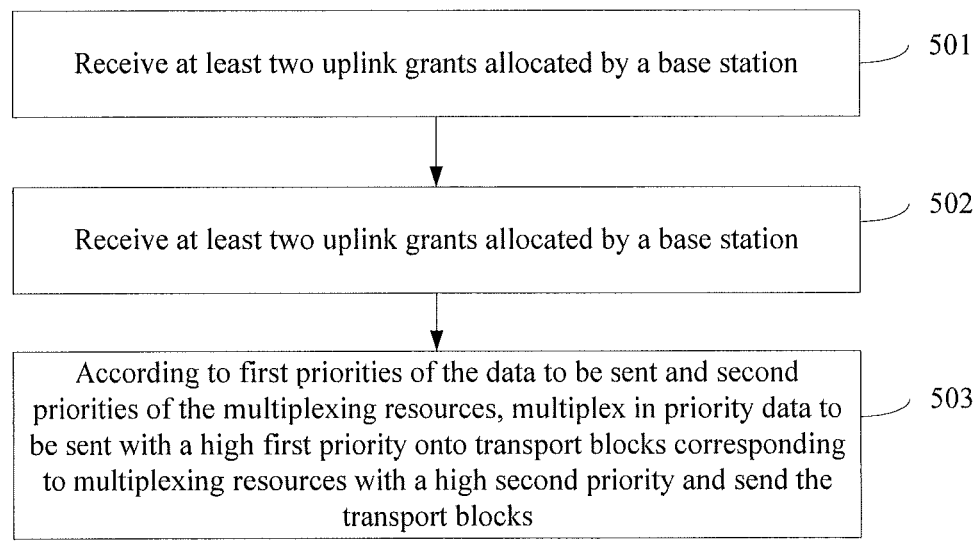
FIG. 5 is a flowchart of a data sending method according to an embodiment of the present invention.

FIG. 5 is a flowchart of a data sending method according to an embodiment of the present invention. The embodiment is executed by a UE (User Equipment, user equipment). Referring to FIG. 5, the embodiment includes:

501. Receive at least two uplink grants allocated by a base station.

502. Group uplink grants received at different moments in the at least two uplink grants to obtain multiplexing resources.

A specific implementation manner of steps 501 and 502 is the same as that of steps 201 and 202 and will not be repeated here.

503. According to first priorities of the data to be sent and second priorities of the multiplexing resources, multiplex in priority data to be sent with a high first priority onto transport blocks corresponding to multiplexing resources with a high second priority and send the transport blocks.

The first priorities are multiplexing priorities of data in the data to be sent. In a multiplexing process, to ensure a short delay of important data, data with a high priority is multiplexed onto transport blocks corresponding to uplink grants with relatively reliable QoS. First priorities may be set for data to be sent and a multiplexing order or multiplexing priorities may be set for uplink grants in the multiplexing resources. In the embodiment, data to be sent includes preset non-critical data, preset critical data or control elements, where a first priority of preset critical data or control elements is higher than that of preset critical data. Alternatively, only critical data or control elements are used as preset critical data and other data is used as preset non-critical data. The at least two uplink grants include at least two of the following uplink grants: a PDCCH C-RNTI UL Grant, an SPS C-RNTI UL Grant, an RAR UL Grant, and a Configured UL Grant, where second priorities of the PDCCH C-RNTI UL Grant, the SPS C-RNTI UL Grant, and the Configured ULGrant are higher than a second priority of the RAR UL Grant.

Because the RAR UL Grant comes with a long delay, and with regard to contention based random access, the RAR UL Grant is subject to risks of data loss due to contention failure, in a multiplexing process, preset critical data or control elements such as a BSR MAC CE and a PHR MAC CE may be multiplexed selectively onto a transport block corresponding to at least one uplink grant of the PDCCH Grant, the SPS C-RNTI UL Grant, and the Configured UL Grant, and preset non-critical data such as C-RNTI and other contents is multiplexed on the RAR UL Grant, or preset critical data is not carried over a transport block corresponding to the RAN UL Grant.

Step 503 may specifically include: based on a descending order of second priorities of the uplink grants in the multiplexing resources, sequentially multiplexing data in the data to be sent according to a descending order of first priorities onto transport blocks corresponding to the uplink grants and sending the transport blocks, for example, multiplexing data with a highest first priority onto an uplink grant with a highest second priority and sending the transport block.

Specifically, for a composition of the uplink grants, the step includes:

when the at least two uplink grants include a PDCCH C-RNTI UL Grant, an SPS C-RNTI UL Grant, a Configured ULGrant, and an RAR UL Grant, multiplexing the preset critical data or control elements in the data to be sent onto a transport block corresponding to at least one uplink grant of the PDCCH C-RNTI UL Grant, the SPS C-RNTI UL Grant, and the Configured UL Grant and sending the transport block, and multiplexing the preset non-critical data onto a transport block corresponding to the RAR UL Grant and sending the transport block, or not letting the preset critical data or control elements be carried over a transport block corresponding to the RAL UL Grant;

when the at least two uplink grants include a PDCCH C-RNTI UL Grant and an RAR UL Grant, multiplexing the preset critical data or control elements in the data to be sent onto a transport block corresponding to the PDCCH C-RNTI UL Grant and sending the transport block, and multiplexing the preset non-critical data onto a transport block corresponding to the RAR UL Grant and sending the transport block, or not letting the preset critical data or control elements be carried over a transport block corresponding to the RAL UL Grant;

when the at least two uplink grants include an SPS C-RNTI UL Grant and an RAR UL Grant, multiplexing the preset critical data or control elements in the data to be sent onto a transport block corresponding to the SPS C-RNTI UL Grant and sending the transport block, and multiplexing the preset non-critical data onto a transport block corresponding to the RAR UL Grant and sending the transport block, or not letting the preset critical data or control elements be carried over a transport block corresponding to the RAL UL Grant; and when the at least two uplink grants include a Configured UL Grant and an RAR UL Grant, multiplexing the preset critical data or control elements in the data to be sent onto a transport block corresponding to the Configured UL Grant and sending the transport block, and multiplexing the preset non-critical data onto a transport block corresponding to the RAR UL Grant and sending the transport block, or not letting the preset critical data or control elements be carried over a transport block corresponding to the RAL UL Grant.

According to the method provided in the embodiment, when uplink grants allocated by a base station are received, the uplink grants are grouped according to sending moments of transport blocks corresponding to the uplink grants so as to determine multiplexing resources, and data is multiplexed onto transport blocks corresponding to the grouped uplink grants and the transport blocks are sent, so that a UE can judge delays of different uplink resources according to the sending moments, and adjust a multiplexing order according to possible delays, so as to avoid an increase of delay when high priority data is transmitted. Further, multiplexing is performed according to multiplexing priorities of data to be sent and multiplexing priorities of uplink grants in one multiplexing group, which ensures security and timeliness of high priority data.

Figure 6:
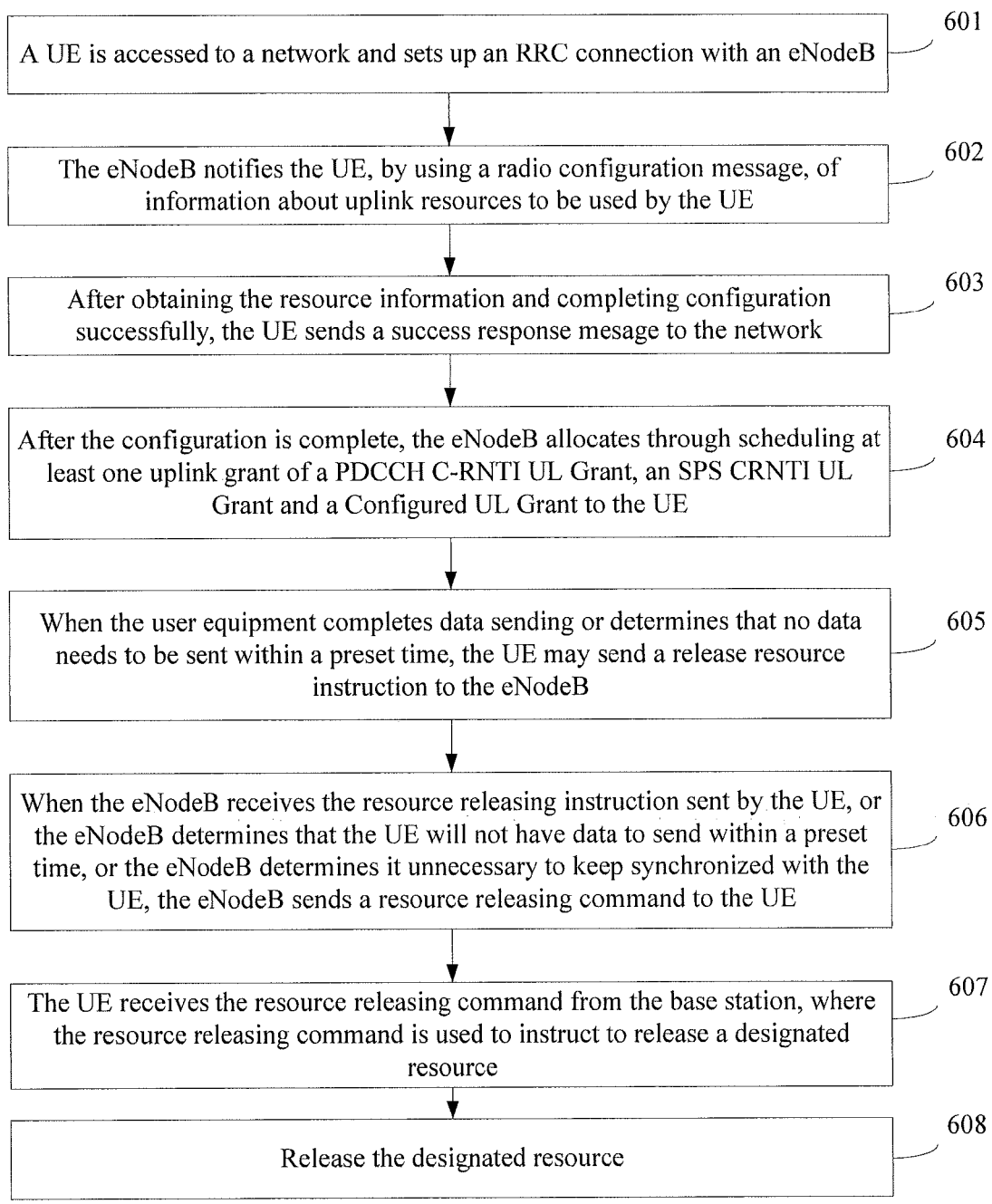
FIG. 6 is a flowchart of a data sending method according to an embodiment of the present invention.

FIG. 6 is a flowchart of a data sending method according to an embodiment of the present invention. Two interacting bodies of the embodiment are a UE (User Equipment, user equipment) and a base station eNodeB (Evolved NodeB, evolved base station). Referring to FIG. 6, the embodiment includes:

601. A UE is accessed to a network and sets up an RRC connection with an eNodeB.

602. The eNodeB notifies the UE, by using a radio configuration message, of information about uplink resources to be used by the UE, such as PUCCH resource information, for example, scheduling request resource information, SRS resource information, and SPS resource information.

The radio configuration message may be an RRC (Radio Resource Control, Radio Resource Control) message.

603. After obtaining the resource information and completing configuration successfully, the UE sends a success response message to the network.

604. After the configuration is completed, the eNodeB allocates through scheduling at least one uplink grant of a PDCCH C-RNTI UL Grant, an SPS C-RNTI UL Grant, and a Configured UL Grant to the UE.

A person skilled in the art may know that, in the allocation process, the eNodeB also allocates a shared channel uplink resource PUSCH UL Grant, a shared channel downlink assignment (resource) PDSCH Assignment to the UE, and when the UE is synchronized with the eNodeB, to assist the UE in initiating a resource request, in the process, the eNodeB may further allocate a scheduling request resource to the UE; and to measure channel quality of the UE, when the UE is synchronized with the eNodeB, the eNodeB may allocate an uplink reference signal sending resource to the UE, for example an SRS (Sounding Reference Signal, interception reference signal).

605. When the user equipment completes data sending or determines that no data needs to be sent within a preset time, the UE may send a resource releasing instruction to the eNodeB, so that the eNodeB sends a resource releasing command according to the resource releasing instruction, where the resource releasing instruction may be an out-of-frame request message.

The preset time may be preset by a technical person and is not limited in the embodiment of the present invention.

606. When the eNodeB receives the resource releasing instruction sent by the UE, or the eNodeB determines that the UE will not have data to send within a preset time, or the eNodeB determines it unnecessary to keep synchronized with the UE, the eNodeB sends a resource releasing command to the UE.

The resource releasing instruction may be an out-of-frame request message, and if the command is a resource releasing command, the resource releasing command may carry a designated resource to be released, where the resource releasing command may be an out-of-synchronization command.

It should be noted that step 605 may be omitted, and instead, the eNodeB directly determines that the UE will not have data to send within a preset time in step 606 and the eNodeB sends a resource releasing command, for example, an out-of-synchronization command, to the UE proactively.

The out-of-synchronization command is used to instruct the UE to cause a timing advance timer to expire, or instruct the UE to be out of timing and enter an out-of-synchronization state, and instruct the UE to release or dump all UL Grants and downlink assignments (Downlink Assignment), PUCCH resources, scheduling request resources, and SRS resources, and dump all HARQ (Hybrid Automatic Repeat reQuest, hybrid automatic repeat request) buffers.

Or, the out-of-synchronization command may instruct the UE to release specific resources, for example, PUCCH resources, or specific types of resources among PUCCH resources, such as scheduling request resources and SRS resources.

Or, when multiple serving cells are configured, the out-of-synchronization command may instruct to cause a timing advance timer of one Cell or all Cells in one Cell group to expire, or instruct to enter an out-of-synchronization state, and further instruct the UE to release resources of one Cell or all Cells in the group. Cell groups may be divided based on Bands or whether a TA (Time Advance, timing advance) can be shared, which means that Cells that can share a TA belong to one group. A person skilled in the art may know that an LTE system is a non-synchronous system, where, when a UE sends uplink data, the UE must be in a synchronized state, and the UE adjusts a timing advance for uplink sending according to an out-of-synchronization command from the eNodeB so as to ensure synchronization with the base station. When the UE receives an adjusting timing advance command TA Command from the eNodeB, the UE starts a TA timer. Before the Timer expires, the UE always thinks it is in a synchronized state, and after the Timer expires, the UE enters a non-synchronized state.

A person skilled in the art may know that a Cell group means that in a carrier aggregation scenario, a base station can configure and activate multiple serving cells (Serving Cell) for a user equipment and that the base station or the user equipment groups the serving cells based on a specific rule, for example, sharing of uplink timing.

607. The UE receives the resource releasing command from the base station, where the resource releasing command is used to instruct to release a designated resource.

Here, the designated resource includes at least one of the following resources: a received data channel uplink grant, a control channel scheduling request resource, and a control channel uplink reference signal resource.

608. Release the designated resource.

Specifically, when the resource releasing command is an out-of-synchronization command, the releasing the designated resource specifically includes: causing the timing advance timer of the UE to expire or causing the UE to enter an out-of-synchronization state, and releasing or dumping the designated resource.

In the embodiment, when the UE receives the resource releasing command, the UE excludes the designated resource indicated in the resource releasing command. Once released, the designated resource will not participate in a subsequent multiplexing process. This avoids occupation of unnecessary resources by the UE, or a data delay caused by multiplexing of data on resources already released by the base station.

Accordingly, a multiplexing resource grouping process following step 608 includes: grouping uplink grants received at different moments in the at least two uplink grants to obtain multiplexing resources, where the at least two uplink grants do not include the designated resource.

In the grouping process, the scope of grouping does not include the designated resource already released.

It should be noted that the foregoing embodiment of the present invention is applicable to an LTE system or a UMTS (Universal Mobile Telecommunications System, Universal Mobile Telecommunications System) system.

According to the method provided in the embodiment, when uplink resources allocated by a base station are received, the uplink resources are grouped according to sending moments of transport blocks corresponding to the uplink resources so as to determine multiplexing resources, and data is multiplexed onto transport blocks corresponding to the grouped uplink resources and the transport blocks are sent, so that a UE can judge delays of different uplink resources according to the sending moments, and adjust a multiplexing order according to possible delays, so as to avoid an increase of delay when high priority data is transmitted. Further, because the base station instructs the UE in time to release invalid resources, UL Grants in the resource releasing command can be excluded when multiplexing is performed, which avoids occupation of unnecessary resources by the UE, or a data delay caused by multiplexing of data on resources already released by the base station.

Figure 7:
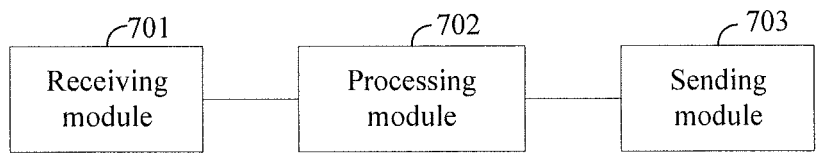
FIG. 7 is a schematic structural diagram of a user equipment according to an embodiment of the present invention.

FIG. 7 is a schematic structural diagram of a user equipment according to an embodiment of the present invention. The user equipment may be a terminal that can communicate with a base station. Referring to FIG. 7, the user equipment includes:

a receiving module 701, configured to receive at least two uplink grants allocated by a base station;

a processing module 702, configured to group uplink grants received at different moments in the at least two uplink grants received by the receiving module 701 to obtain multiplexing resources; and a sending module 703, configured to multiplex data to be sent onto transport blocks corresponding to the multiplexing resources obtained by the processing module 702 and send the transport blocks.

The processing module 702 is specifically configured to group, according to sending moments of transport blocks corresponding to the at least two uplink grants received by the receiving module 701, uplink grants received at different moments and sent at the same moment in the at least two uplink grants into one group to obtain multiplexing resources.

Figure 8:
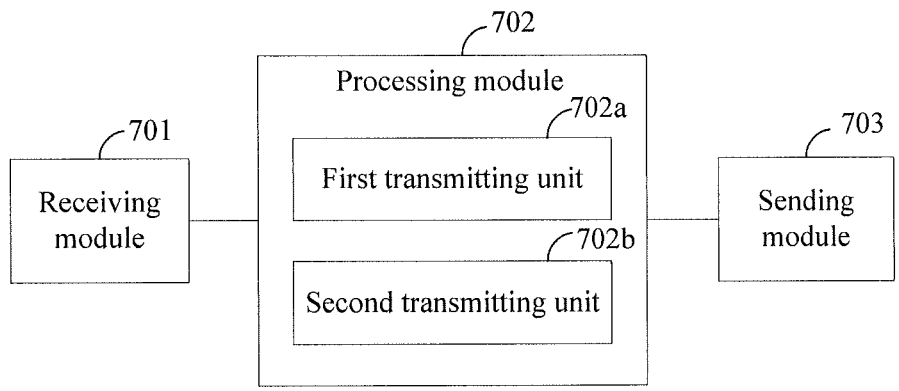
FIG. 8 is a schematic structural diagram of a user equipment according to an embodiment of the present invention.

Referring to FIG. 8, the processing module 702 includes at least one of the following units:

a first sending unit 702a, configured to multiplex in priority, according to first priorities of the data to be sent and second priorities of the multiplexing resources obtained by the processing module 702, data to be sent with a high first priority onto transport blocks corresponding to multiplexing resources with a high second priority and send the transport blocks; and a second sending unit 702b, configured to multiplex, according to second priorities of the multiplexing resources obtained by the processing module 702 and based on a descending order of the second priorities, data to be sent onto transport blocks corresponding to the multiplexing resources obtained by the processing module 702 and send the transport blocks;

where, the first priorities are multiplexing priorities of data in the data to be sent and the second priorities are multiplexing priorities of uplink grants in the multiplexing resources.

The at least two uplink grants include at least two of the following uplink grants:

a physical downlink control channel cell-radio network temporary identifier uplink grant PDCCH C-RNTI UL Grant, a semi-persistent scheduling cell-radio network temporary identifier uplink grant SPS C-RNTI UL Grant, a random access response uplink grant RAR UL Grant, and a configured uplink grant Configured UL Grant, where second priorities of the PDCCH C-RNTI UL Grant, the SPS C-RNTI UL Grant, and the Configured UL Grant are higher than a second priority of the RAR UL Grant.

When, in the data to be sent, a first priority of preset critical data or control elements is higher than that of preset non-critical data, the first sending unit 702a is specifically configured to: when the at least two uplink grants include a PDCCH C-RNTI UL Grant, an SPS C-RNTI UL Grant, a Configured UL Grant, and an RAR UL Grant, multiplex the preset critical data or control elements in the data to be sent onto a transport block corresponding to at least one uplink grant of the PDCCH C-RNTI UL Grant, the SPS C-RNTI UL Grant, and the Configured UL Grant and send the transport block, and multiplex the preset non-critical data onto a transport block corresponding to the RAR UL Grant and send the transport block, or not let the preset critical data or control elements be carried over a transport block corresponding to the RAL UL Grant;

the first sending unit 702a is further configured to: when the at least two uplink grants include a PDCCH C-RNTI UL Grant and an RAR UL Grant, multiplex the preset critical data or control elements in the data to be sent onto a transport block corresponding to the PDCCH C-RNTI UL Grant and send the transport block, and multiplex the preset non-critical data onto a transport block corresponding to the RAR UL Grant and send the transport block, or not let the preset critical data or control elements be carried over a transport block corresponding to the RAL UL Grant;

the first sending unit 702a is further configured to: when the at least two uplink grants include an SPS C-RNTI UL Grant and an RAR UL Grant, multiplex the preset critical data or control elements in the data to be sent onto a transport block corresponding to the SPS C-RNTI UL Grant and send the transport block, and multiplex the preset non-critical data onto a transport block corresponding to the RAR UL Grant and send the transport block, or not let the preset critical data or control elements be carried over a transport block corresponding to the RAL UL Grant; and the first sending unit 702a is further configured to: when the at least two uplink grants include a Configured UL Grant and an RAR UL Grant, multiplex the preset critical data or control elements in the data to be sent onto a transport block corresponding to the Configured UL Grant and send the transport block, and multiplex the preset non-critical data onto a transport block corresponding to the RAR UL Grant and send the transport block, or not let the preset critical data or control elements be carried over a transport block corresponding to the RAL UL Grant.

The receiving module 701 is further configured to receive a resource releasing command from a base station, where the resource releasing command is used to release a designated resource.

Figure 9:
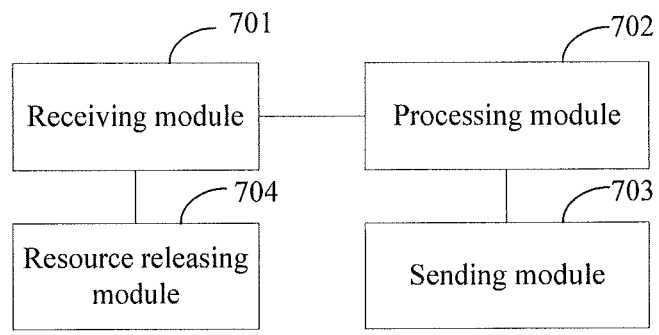
FIG. 9 is a schematic structural diagram of a user equipment according to an embodiment of the present invention.

Accordingly, referring to FIG. 9, the user equipment further includes:

a resource releasing module 704, configured to release the designated resource according to the resource releasing command received by the receiving module 701.

Accordingly, the processing module 702 is specifically configured to group uplink grants received at different moments in the at least two uplink grants received by the receiving module 701 to obtain multiplexing resources, where the at least two uplink grants do not include the designated resource.

Figure 10:
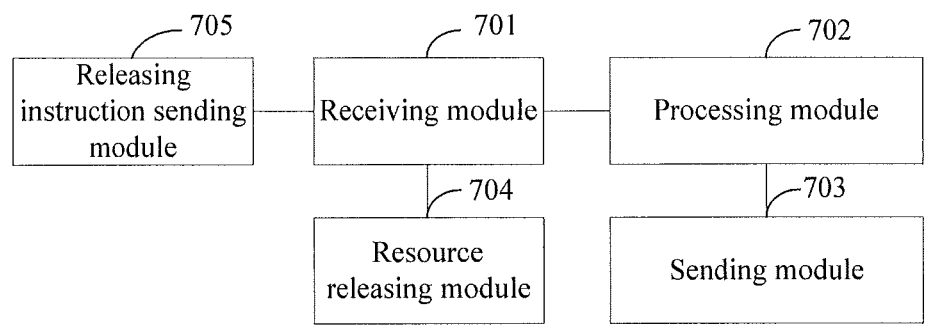
FIG. 10 is a schematic structural diagram of a user equipment according to an embodiment of the present invention.

Referring to FIG. 10, the user equipment further includes:

a releasing instruction sending module 705, configured to: when data sending is completed, or when it is determined that data does not need to be sent within a preset time, send a resource releasing instruction to the base station, so that the base station sends the resource releasing command according to the resource releasing instruction.

The resource releasing command is an out-of-synchronization command sent by the base station. Accordingly, the resource releasing module 704 is specifically configured to cause, according to the resource releasing command received by the receiving module 701, a timing advance timer to expire or cause the UE to enter an out-of-synchronization state, and release or dump the designated resource.

The designated resource includes at least one of the following resources:

a received uplink grant, a control channel scheduling request resource, and a control channel uplink reference signal resource.

The received uplink grant may include any one of the following uplink grants: a physical downlink control channel cell-radio network temporary identifier uplink grant PDCCH C-RNTI UL Grant, a semi-persistent scheduling cell-radio network temporary identifier uplink grant SPS C-RNTI UL Grant, a random access response uplink grant RAR UL Grant, and a configured uplink grant Configured UL Grant.

The user equipment is applicable to a Long Term Evolution system LTE or a Universal Mobile Telecommunications System UMTS.

The user equipment provided in the embodiment falls into the same idea as the method embodiments. For specific implementation processes, see the method embodiments for details, which will not be repeated here.

A person of ordinary skill in the art may understand that all or a part of the steps of the foregoing embodiments may be implemented by hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A data sending method, comprising:
   receiving at least two uplink grants allocated by a base station;
   grouping, according to sending moments of transport blocks corresponding to the at least two uplink grants, uplink grants received at different moments in the at least two uplink grants to obtain multiplexing resources;
   multiplexing data to be sent onto transport blocks corresponding to the multiplexing resources and sending the transport blocks;
   determining delays of different uplink resources according to the sending moments; and
   adjusting a multiplexing order according to the determined delays.

2. The method according to claim 1, wherein the grouping uplink grants received at different moments in the at least two uplink grants to obtain multiplexing resources specifically comprises:
   grouping, according to sending moments of transport blocks corresponding to the at least two uplink grants, the uplink grants received at different moments and sent at the same moment in the at least two uplink grants into one group to obtain multiplexing resources.

3. The method according to claim 1, wherein the multiplexing data to be sent onto transport blocks corresponding to the multiplexing resources and sending the transport blocks specifically comprises:
   multiplexing in priority, according to first priorities of the data to be sent and second priorities of the multiplexing resources, data to be sent with a high first priority onto transport blocks corresponding to multiplexing resources with a high second priority and sending the transport blocks;
   or,
   multiplexing, according to second priorities of the multiplexing resources and based on a descending order of the second priorities, the data to be sent onto the transport blocks corresponding to the multiplexing resources and sending the transport blocks;
   wherein, the first priorities are multiplexing priorities of data in the data to be sent, and the second priorities are multiplexing priorities of uplink grants in the multiplexing resources.

4. The method according to claim 3, wherein the at least two uplink grants comprise at least two of the following uplink grants:
   a physical downlink control channel cell-radio network temporary identifier uplink grant PDCCH C-RNTI UL Grant, a semi-persistent scheduling cell-radio network temporary identifier uplink grant SPS C-RNTI UL Grant, a random access response uplink grant RAR UL Grant, and a configured uplink grant Configured UL Grant, wherein second priorities of the PDCCH C-RNTI UL Grant, the SPS C-RNTI UL Grant and the Configured UL Grant are higher than a second priority of the RAR UL Grant.

5. The method according to claim 4, wherein, in the data to be sent, a first priority of preset critical data or control elements is higher than a first priority of preset non-critical data, and the multiplexing in priority, according to first priorities of the data to be sent and second priorities of the multiplexing resources, data to be sent with a high first priority onto transport blocks corresponding to multiplexing resources with a high second priority and sending the transport blocks specifically comprises:
   when the at least two uplink grants comprise a PDCCH C-RNTI UL Grant, an SPS C-RNTI UL Grant, a Configured UL Grant, and an RAR UL Grant, multiplexing the preset critical data or control elements in the data to be sent onto a transport block corresponding to at least one uplink grant of the PDCCH C-RNTI UL Grant, the SPS C-RNTI UL Grant and the Configured UL Grant and sending the transport block, and multiplexing the preset non-critical data onto a transport block corresponding to the RAR UL Grant and sending the transport block, or not letting the preset critical data or control elements be carried over a transport block corresponding to the RAR UL Grant;

when the at least two uplink grants comprise a PDCCH C-RNTI UL Grant and an RAR UL Grant, multiplexing the preset critical data or control elements in the data to be sent onto a transport block corresponding to the PDCCH C-RNTI UL Grant and sending the transport block, and multiplexing the preset non-critical data onto a transport block corresponding to the RAR UL Grant and sending transport block, or not letting the preset critical data or control elements be carried over a transport block corresponding to the RAR UL Grant;

when the at least two uplink grants comprise an SPS C-RNTI UL Grant and an RAR UL Grant, multiplexing the preset critical data or control elements in the data to be sent onto a transport block corresponding to the SPS C-RNTI UL Grant and sending the transport block, and multiplexing the preset non-critical data onto a transport block corresponding to the RAR UL Grant and sending the transport block, or not letting the preset critical data or control elements be carried over a transport block corresponding to the RAR UL Grant; and when the at least two uplink grants comprise a Configured UL Grant and an RAR UL Grant, multiplexing the preset critical data or control elements in the data to be sent onto a transport block corresponding to the Configured UL Grant and sending the transport block, and multiplexing the preset non-critical data onto a transport block corresponding to the RAR UL Grant and sending the transport block, or not letting the preset critical data or control elements be carried over a transport block corresponding to the RAR UL Grant.

6. The method according to claim 1, wherein the method further comprises:
  receiving a resource releasing command from a base station, wherein the resource releasing command is used to instruct to release a designated resource; and
  releasing the designated resource; and
  the grouping uplink grants received at different moments in the at least two uplink grants to obtain multiplexing resources specifically comprises:
    grouping uplink grants received at different moments in the at least two uplink grants to obtain multiplexing resources, wherein the at least two uplink grants do not comprise the designated resource.

7. The method according to claim 6, wherein, before the receiving a resource releasing command from a base station, the method further comprises:
  when data sending is completed, or when it is determined that data does not need to be sent within a preset time, sending a resource releasing instruction to the base station, so that the base station sends the resource releasing command according to the resource releasing instruction.

8. The method according to claim 6, wherein the resource releasing command is an out-of-synchronization command sent by the base station, and accordingly, the releasing the designated resource specifically comprises:
  causing a timing advance timer to expire or entering an out-of-synchronization state, and releasing or dumping the designated resource.

9. The method according to claim 6, wherein the designated resource comprises at least one of the following resources:
  a received uplink grant UL Grant, a control channel scheduling request resource, and a control channel uplink reference signal resource.

10. The method according to claim 1, wherein the method is applicable to a Long Term Evolution system LTE or a Universal Mobile Telecommunications System UMTS.

11. A user equipment, comprising:
  a receiver, configured to receive at least two uplink grants allocated by a base station;
  a processor, configured to group, according to sending moments of transport blocks corresponding to the at least two uplink grants, uplink grants received at different moments in the at least two uplink grants received by the receiver to obtain multiplexing resources; and
  a transmitter, configured to multiplex data to be sent onto transport blocks corresponding to the multiplexing resources obtained by the processor, send the transport blocks, determine delays of different uplink resources according to the sending moments, and adjust a multiplexing order according to the determined delays.

12. The user equipment according to claim 11, wherein the processor is specifically configured to group, according to sending moments of transport blocks corresponding to the at least two uplink grants received by the receiver, uplink grants received at different moments and sent at the same moment in the at least two uplink grants into one group to obtain multiplexing resources.

13. The user equipment according to claim 11, wherein the transmitter comprises at least one of the following:
  a first transmitter, configured to multiplex in priority, according to first priorities of the data to be sent and second priorities of the multiplexing resources obtained by the processor, data to be sent with a high first priority onto transport blocks corresponding to multiplexing resources with a high second priority and sending the transport blocks; and
  a second transmitter, configured to multiplex, according to second priorities of the multiplexing resources obtained by the processor and based on a descending order the second priorities, the data to be sent onto transport blocks corresponding to the multiplexing resources obtained by the processor and send the transport blocks;
  wherein, the first priorities are multiplexing priorities of data in the data to be sent and the second priorities are multiplexing priorities of uplink grants in the multiplexing resources.

14. The user equipment according to claim 13, wherein the at least two uplink grants comprise at least two of the following uplink grants:
  a physical downlink control channel cell-radio network temporary identifier uplink grant PDCCH C-RNTI UL Grant, a semi-persistent scheduling cell-radio network temporary identifier uplink grant SPS C-RNTI UL Grant, a random access response uplink grant RAR UL Grant, and a configured uplink grant Configured UL Grant, wherein second priorities of the PDCCH C-RNTI UL Grant, the SPS C-RNTI UL Grant, and the Configured UL Grant are higher than a second priority of the RAR UL Grant.

15. The user equipment according to claim 14, wherein, in the data to be sent, a first priority of preset critical data or control elements is higher than a first priority of preset non-critical data,
  the first transmitter is specifically configured to: when the at least two uplink grants comprise a PDCCH C-RNTI UL Grant, an SPS C-RNTI UL Grant, a Configured UL Grant, and an RAR UL Grant, multiplex the preset critical data or control elements in the data to be sent onto a transport block corresponding to at least one uplink grant of the PDCCH C-RNTI UL Grant, the SPS C-RNTI UL Grant, and the Configured UL Grant and send the transport block, and multiplex the preset non-critical data onto a transport block corresponding to the RAR UL Grant and send the transport block, or not let the preset critical data or control elements be carried over a transport block corresponding to the RAR UL Grant;

the first transmitter is further configured to: when the at least two uplink grants comprise a PDCCH C-RNTI UL Grant and an RAR UL Grant, multiplex the preset critical data or control elements in the data to be sent onto a transport block corresponding to the PDCCH C-RNTI UL Grant and send the transport block, and multiplex the preset non-critical data onto a transport block corresponding to the RAR UL Grant and send the transport block, or not let the preset critical data or control elements be carried over a transport block corresponding to the RAR UL Grant;

the first transmitter is further configured to: when the at least two uplink grants comprise an SPS C-RNTI UL Grant and an RAR UL Grant, multiplex the preset critical data or control elements in the data to be sent onto a transport block corresponding to the SPS C-RNTI UL Grant and send the transport block, and multiplex the preset non-critical data onto a transport block corresponding to the RAR UL Grant and send the transport block, or not let the preset critical data or control elements be carried over a transport block corresponding to the RAR UL Grant; and the first transmitter is further configured to: when the at least two uplink grants comprise a Configured UL Grant and an RAR UL Grant, multiplex the preset critical data or control elements in the data to be sent onto a transport block corresponding to the Configured UL Grant and send the transport block, and multiplex the preset non-critical data onto a transport block corresponding to the RAR UL Grant and send the transport block, or not let the preset critical data or control elements be carried over a transport block corresponding to the RAR UL Grant.

16. The user equipment according to claim 11, wherein the receiver is further configured to receive a resource releasing command from a base station, wherein the resource releasing command is used to instruct to release a designated resource;

the user equipment further comprises:
  a resource releaser, including at least one processor, configured to release the designated resource according to the resource releasing command received by the receiver; and
  the processor is specifically configured to group uplink grants received at different moments in the at least two uplink grants received by the receiver to obtain multiplexing resources, wherein the at least two uplink grants do not comprise the designated resource.

17. The user equipment according to claim 16, wherein the user equipment further comprises:
  a releasing instruction transmitter, configured to: when data sending is completed, or when it is determined that data does not need to be sent within a preset time, send a resource releasing instruction to the base station, so that the base station sends the resource releasing command according to the resource releasing instruction.

18. The user equipment according to claim 16, wherein the resource releasing command is an out-of-synchronization command sent by the base station, and accordingly, the resource releaser is specifically configured to cause, according to the resource releasing command received by the receiver, a timing advance timer to expire or enter an out-of-synchronization state, and release or dump the designated resource.

19. The user equipment according to claim 16, wherein the designated resource comprises at least one of the following resources:
  a received uplink grant UL Grant, a control channel scheduling request resource, and a control channel uplink reference signal resource.

20. The user equipment according to claim 11, wherein the user equipment is applicable to a Long Term Evolution system LTE or a Universal Mobile Telecommunications System UMTS.

* * * * *